(12) United States Patent  (10) Patent No.: US 6,834,905 B2
Okamoto et al.  (45) Date of Patent: Dec. 28, 2004

(54) VEHICLE WINDSHIELD

(75) Inventors: Yutaka Okamoto, Wako (JP); Yuji Kikuchi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/449,185

(22) Filed: May 30, 2003

(65) Prior Publication Data

US 2003/0227190 A1 Dec. 11, 2003

(30) Foreign Application Priority Data

Jun. 10, 2002 (JP) ........................................ 2002-169159

(51) Int. Cl.$^7$ ................................................. B60J 1/00
(52) U.S. Cl. ................................................... 296/84.1
(58) Field of Search ........................................ 296/84.1

(56) References Cited

U.S. PATENT DOCUMENTS

| 3,801,423 A | * | 4/1974 | Van Laethem et al. ..... 428/155 |
| 3,822,122 A | | 7/1974 | Plumat et al. |
| 5,238,743 A | * | 8/1993 | Grolig et al. ............ 428/411.1 |
| 6,261,398 B1 | * | 7/2001 | Costa ......................... 156/102 |
| 6,284,383 B1 | * | 9/2001 | Nishiyama ................. 428/430 |
| 6,506,487 B2 | | 1/2003 | Nagai |
| 6,656,597 B2 | * | 12/2003 | Takahara .................... 428/432 |
| 2002/0061395 A1 | * | 5/2002 | Moran et al. ............... 428/215 |
| 2002/0106519 A1 | * | 8/2002 | Takahara .................... 428/426 |
| 2003/0111160 A1 | * | 6/2003 | Bolognese et al. ......... 156/100 |
| 2003/0203214 A1 | * | 10/2003 | Bell et al. ................... 428/426 |

FOREIGN PATENT DOCUMENTS

| JP | 04019136 A | 1/1992 |
| WO | WO 79/00165 | 4/1979 |

* cited by examiner

*Primary Examiner*—Patricia L. Engle
(74) *Attorney, Agent, or Firm*—Merchant & Gould P.C.

(57) ABSTRACT

A windshield of a laminated glass curved to protrude toward the vehicle outside. An interlayer of the laminated glass is tensioned so that the windshield has a force acting to cause the entire laminated glass to flex toward a passenger compartment. The windshield is configured in its entirety to be flexible toward the inside of the passenger compartment, so that the impact of an object colliding with the windshield from the vehicle outside can be absorbed and impact received by the colliding object can be mitigated.

3 Claims, 8 Drawing Sheets

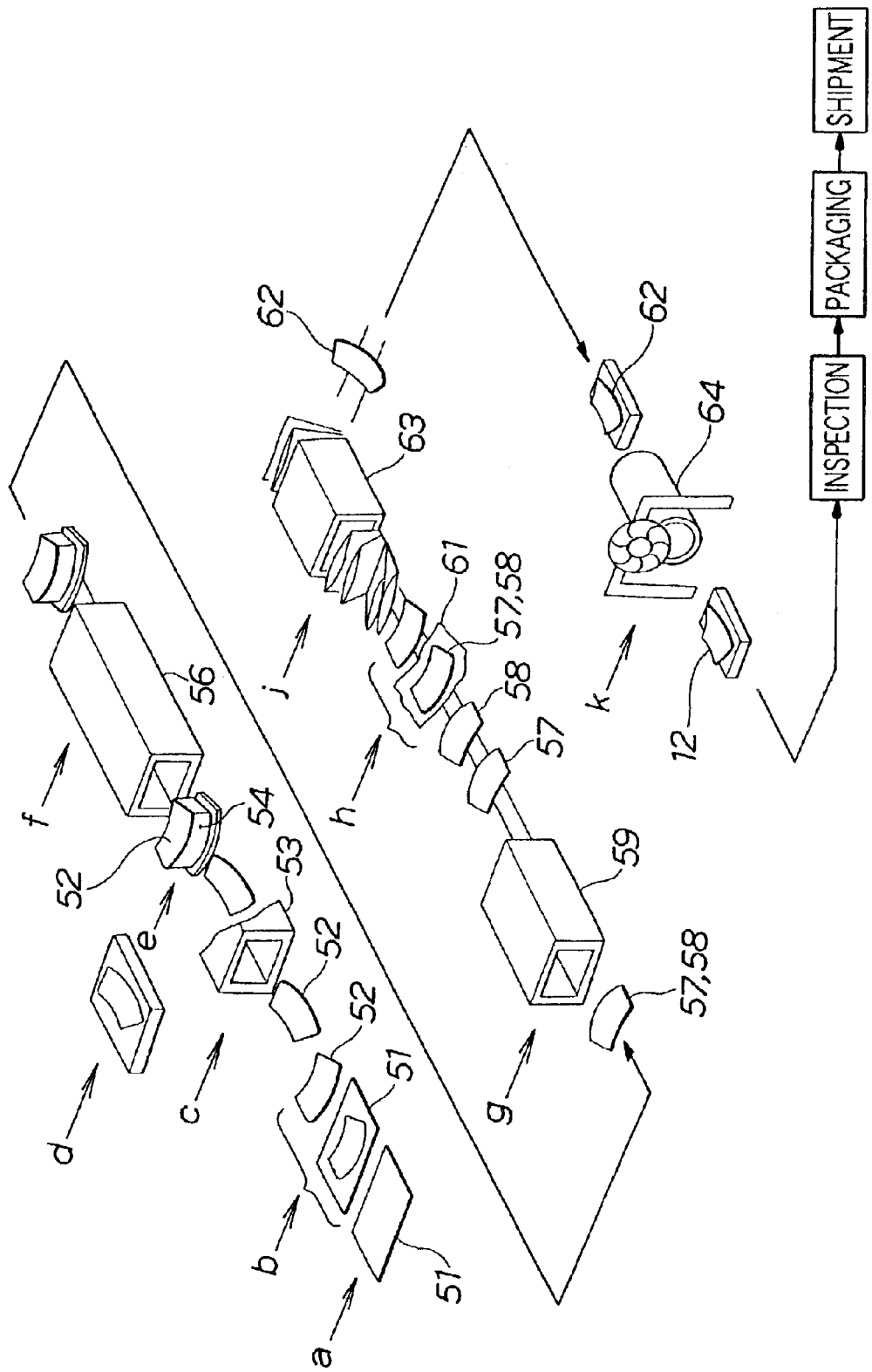

VEHICLE WINDSHIELD

FIELD OF THE INVENTION

The present invention relates to a vehicle windshield for mitigating an impact on a colliding object colliding with the windshield from the front of the vehicle.

BACKGROUND OF THE INVENTION

This kind of windshield is known as disclosed, for example, in Japanese Patent Laid-Open Publication No. HEI-4-19136 as a laminated safety glass which consists of an annealing glass, a resin interlayer bonded to the interior side of the annealing glass, and an impermeable film bonded to the surface on the interior side of the resin interlayer.

Another known example of such a windshield is shown in FIGS. 8A and 8B. These figures illustrate a state in which a colliding object is colliding with a windshield from the interior of the vehicle. In the figures, OUT indicates the outside of a passenger compartment and IN the inside of the passenger compartment.

FIG. 8A illustrates a colliding object 111 heading toward a windshield 112. The windshield 112 is made from a glass having two glasses 113 and 114 curved from the passenger compartment toward the vehicle outside bonded together with a plastic interlayer 115 (hereinafter referred to as a "laminated glass").

The laminated safety glass in HEI-4-19136 or the windshield 112 shown in FIG. 8A takes into account the safety of vehicle passengers, and mitigates the impact on the head of a passenger hitting against the laminated safety glass or the windshield 112 upon a vehicle collision. However, no consideration is given to the safety of pedestrians, that is, a colliding object from the outside of the vehicle compartment toward the laminated safety glass or the windshield 112.

In FIG. 8B, when the colliding object 111 hits on the windshield 112, the windshield 112 is partially broken, mitigating the impact of collision. However, as described above, the windshield 112 does not allow for impact from the outside of the passenger compartment. Further, the windshield 112 has a shape curved outward of the passenger compartment, that is, a so-called "arch" shape in cross section, and is thus more unbreakable against a load from the outside of the passenger compartment than from the inside of the passenger compartment.

Further, recent years' trends toward short-nose vehicles with passenger compartments expanded in space and slant-nose vehicles with front end portions inclined downward to reduce air resistance in high-speed travel result in increased collisions from the vehicle front toward windshields. On the other hand, with an increased rate of seatbelt wearing and the widespread adoption of airbags, importance is being attached to consideration to the safety of pedestrians in addition to the safety of vehicle passengers. In other words, it is desired to effectively mitigate the impact on a colliding object colliding with a windshield from the outside of a vehicle compartment.

SUMMARY OF THE INVENTION

According to one aspect of the present invention, there is provided a vehicle windshield which comprises: a laminated glass curved outward of a passenger compartment, the curved laminated glass being previously provided with a flexing force acting inward of the passenger compartment.

Since the force directed inward of the passenger compartment is previously provided to the windshield carved to protrude toward the vehicle outside, the windshield in its entirety is flexible toward the inside of the passenger compartment. When an object collides with the windshield from the vehicle outside, for example, the windshield can flex toward the vehicle inside, thereby absorbing the impact of the collision and mitigating impact received by the colliding object. Further, the windshield can flex toward the vehicle inside in a concave shape, thereby preventing the colliding object from being thrown out toward the side of the vehicle body after colliding with the windshield.

In a preferred form, the force is produced by applying tension to the interlayer to be disposed in the middle of the laminated glass so that the interlayer has a length larger than a free length. That is, the force is produced in the entire laminated glass by the interlayer constituting a part of the laminated glass, which eliminates the need for the addition of other extra components and can prevent increase in the number of components.

According to another aspect of the present invention, there is further provided a vehicle windshield which comprises: a plurality of sheet glasses curved outward of a vehicle; and an interlayer made from a resin material interposed between the sheet glasses for bonding the sheet glasses together, the interlayer being tensioned in every direction to have a return force.

According to a further aspect of the present invention, there is provided a method of producing a vehicle windshield, which method comprises the steps of: curving a plurality of sheet glasses into a concave shape; applying tension to an interlayer made from a resin material so that the interlayer is stretched in every direction; interposing the tensioned interlayer between the curved sheet glasses; and bonding the curved sheet glasses and the tensioned interlayer together.

In accordance with this method, the curved windshield can be easily provided with a return force.

BRIEF DESCRIPTION OF THE DRAWINGS

Certain preferred embodiments of the present invention will be described in detail below, by way of example only, with reference to the accompanying drawings, in which:

FIG. 6 is a perspective view of a production line illustrating a process of producing the windshield according to the present invention;

DETAILED DESCRIPTION OF THE PREFERRED EMBODIMENTS

The following description is merely exemplary in nature and is in no way intended to limit the invention, its application or uses.

Figure 1:
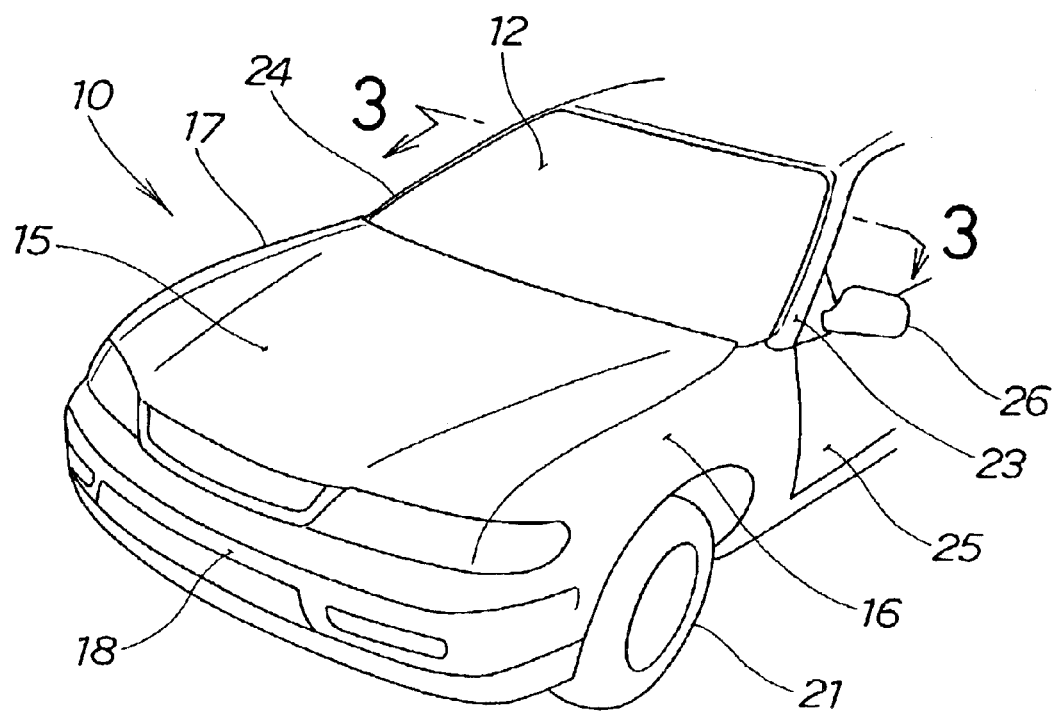
FIG. 1 is a perspective view illustrating a part of a vehicle with a windshield according to the present invention.

Reference is made initially to FIG. 1 showing in perspective the front of a vehicle according to the present invention. A vehicle 10 has a windshield 12 at the front of a passenger compartment. Reference numeral 15 denotes a hood covering an upper portion of an engine compartment, 16 and 17 left and right front fenders, 18 a front bumper, 21 a front wheel (another front wheel is not shown), 23 and 24 left and right A-pillars, 25 a front door, and 26 a door mirror.

Figure 2:
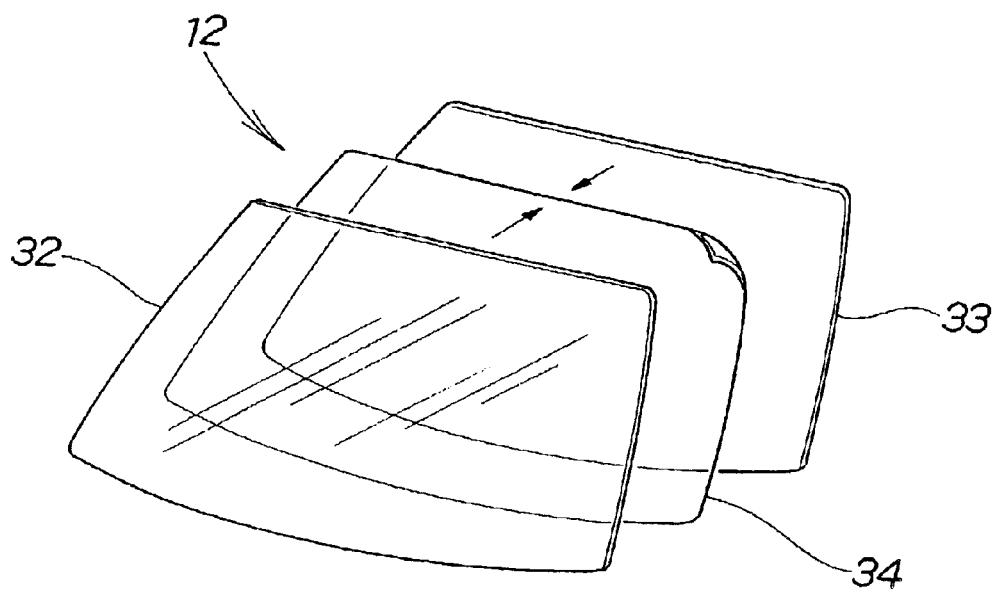
FIG. 2 is an exploded perspective view of the windshield shown in FIG. 1.

As shown in FIG. 2, the windshield 12 is made from a laminated glass, including an outer glass 32 arranged outside of the passenger compartment, an inner glass 33 arranged inside of the passenger compartment, and an interlayer 34 made of soft resin interposed between the outer glass 32 and the inner glass 33, bonding the outer glass 32 and the inner glass 33 together.

Laminated glasses for automobiles are included in automobile safety glasses specified in JIS, defined as ones having at least two sheet glasses bonded together with plastic as an interlayer so as to prevent, when broken by an external force, most broken pieces from scattering with the interlayer. The laminated glasses have improved safety as compared with tempered glasses which are also included in the automobile safety glasses, and are mainly used for windshields and sunshine roofs.

The interlayer 34 is a film of polyvinyl butyral (PVB), and is flexible and tough. When the glass is broken, the interlayer 34 prevents the scattering of broken pieces and the entire collapse of the glass, and is also resistant to the penetration of a colliding object.

The interlayer 34 is bonded to the outer glass 32 and the inner glass 33 while being tensioned to a predetermined degree in the production process.

Figure 3:
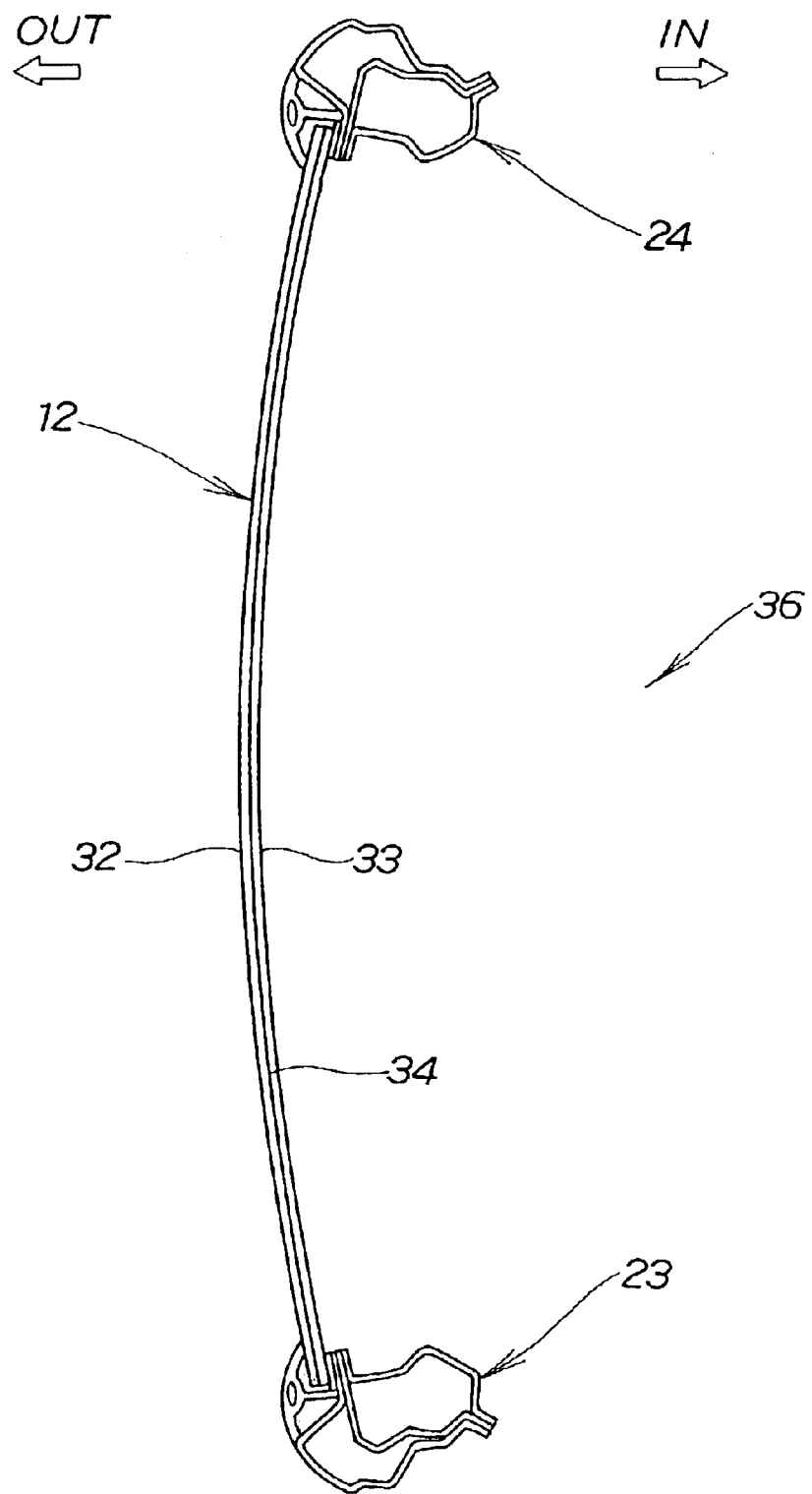
FIG. 3 is a cross-sectional view of the windshield taken along line 3—3 in FIG. 1.

FIG. 3 illustrates the windshield 12 mounted between the left and right A-pillars 23 and 24.

The windshield 12 is curved outward of the vehicle from the interior of a passenger compartment 36. As will be described below, when an external force of a given magnitude acts on the windshield 12 from the vehicle outside, the tension in the interlayer 34 causes the entire windshield 12 to be more flexible, and further mitigates the impact of collision of a colliding object from the vehicle outside if any than in a conventional manner.

Now the function of the interlayer 34 of the windshield 12 will be described with reference to FIGS. 4A and 4B.

Figure 4A:
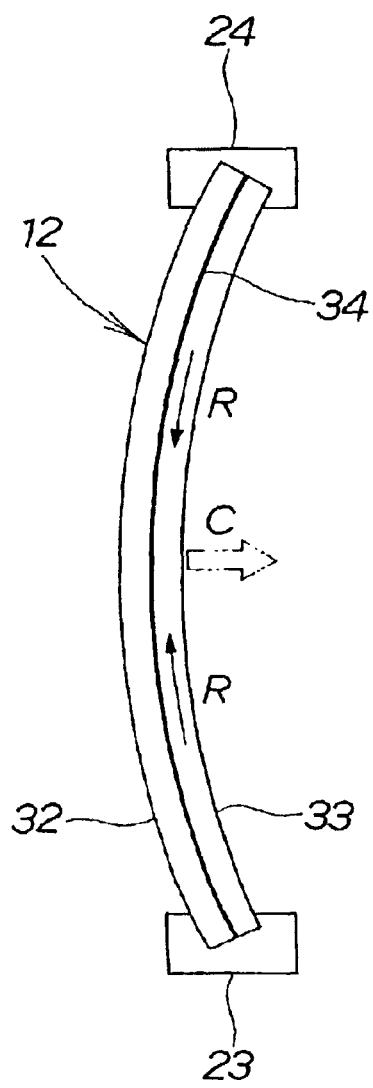
FIGS. 4A and 4B are diagrams illustrating force acting on an interlayer of the windshield according to the present invention.

In FIG. 4A, with the curved windshield 12 mounted between the A-pillars 23 and 24, contracting forces R, R in the directions of arrows occur in the interlayer 34 because tension is applied to the interlayer 34 during the production process. When an elastic cord is stretched and fixed at its opposite ends, for example, the elastic cord attempts to contract to the original length.

Figure 4B:
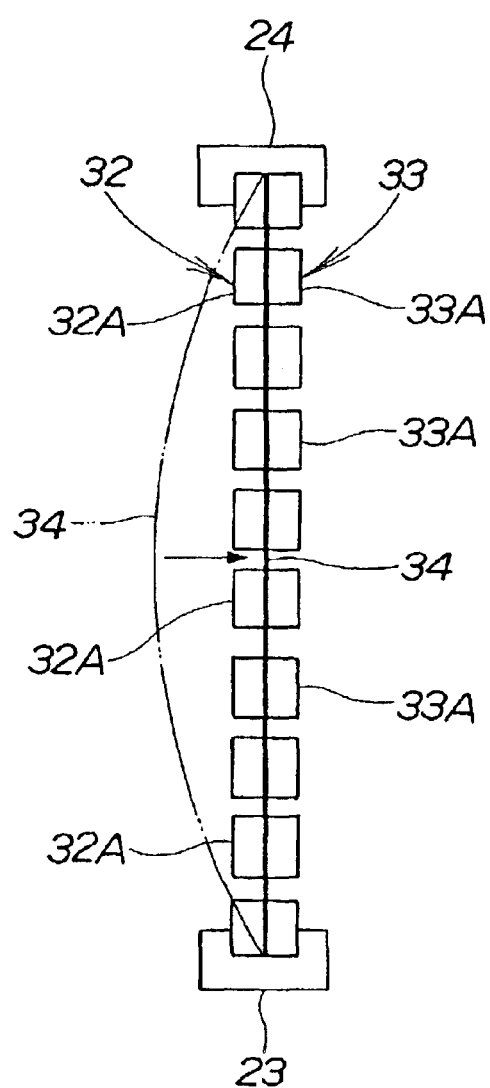

In FIG. 4B, with the outer glass 32 and the inner glass 33 entirely broken (32A and 33A denote broken pieces.) by an object colliding with the windshield 12, there is no restraint on the interlayer 34 which then changes from a curved state into an upright state as shown by an arrow between the A-pillars 23 and 24. A rubber string stretched in a curved shape, for example, becomes straight when no external force acts thereon.

As described with FIGS. 4A and 4B, the interlayer 34 previously tensioned acts to change from a curved state into an upright state. The windshield 12 thus also acts to change from a curved state into an upright state. Specifically, a force C directed toward the passenger compartment as shown by an arrow is produced by a return force of the interlayer 34 in the windshield 12.

The function of the above-described windshield 12 will be described with reference to FIGS. 5A to 5D.

Figure 5A:
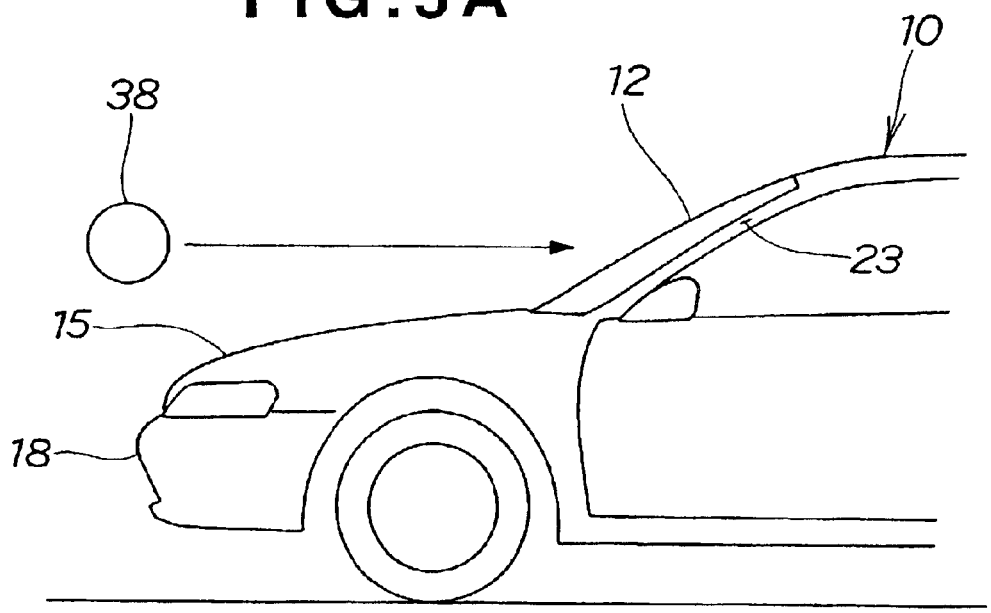
FIGS. 5A to 5D are diagrams illustrating states of the windshield when an object collides with the windshield from the front of the vehicle.
Figure 5B:
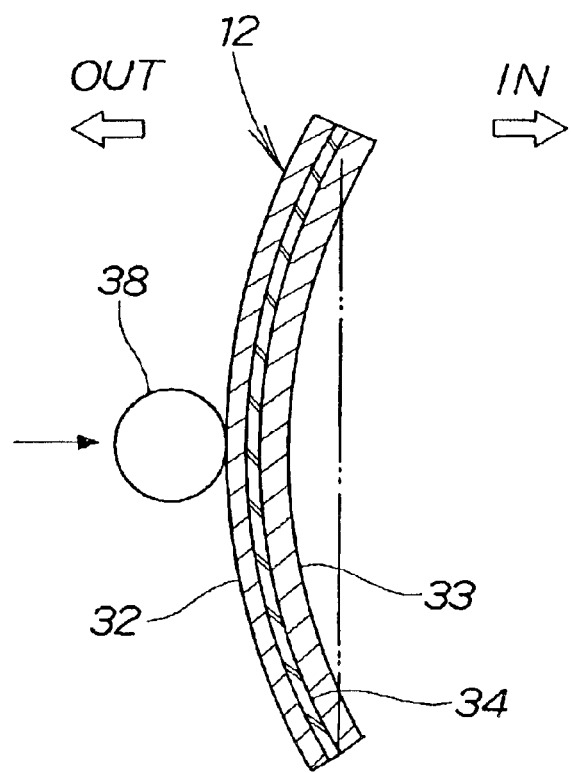
Figure 5C:
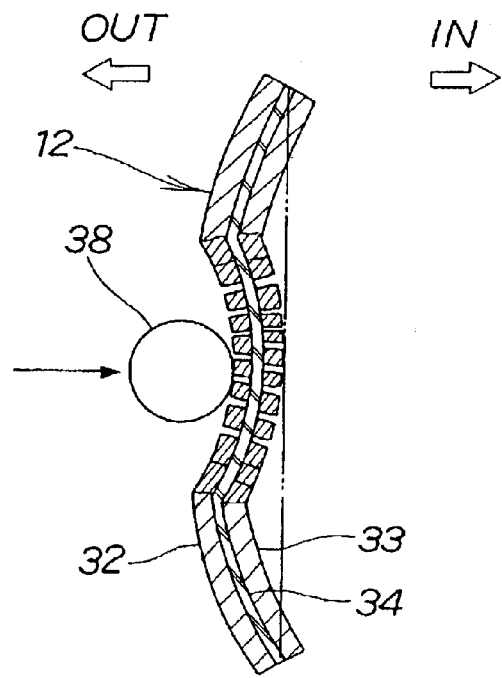

When a colliding object 38 heads toward the windshield 12 from the front of the vehicle 10 as shown by an arrow in FIG. 5A, for example, and collides with the windshield 12 as in FIG. 5B, a central portion of the windshield 12 is broken as shown in FIG. 5C. If the impact is great, the broken part spreads over the entire windshield 12 as shown in FIG. 5D.

Figure 5D:
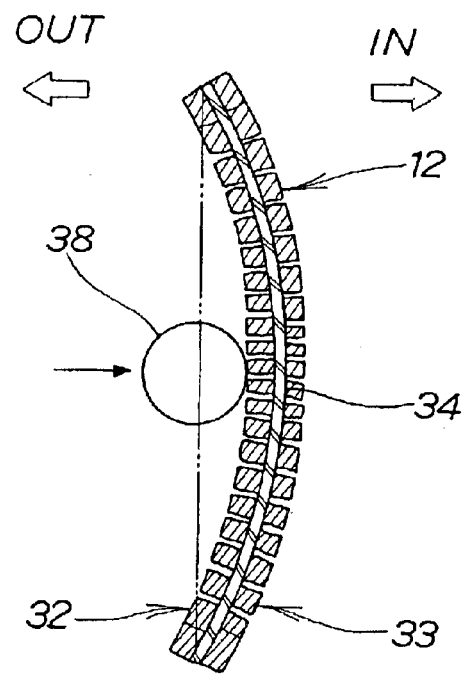

In FIGS. 5C and 5D, the windshield 12, when broken, becomes flexible by the above-described force C in the direction of the passenger compartment (see FIG. 4A), and the broken part becomes upright. After being upright, the windshield 12 is curved inward of the passenger compartment 36 as shown in FIG. 5D by an inertia force of the colliding object 38.

The windshield 12 thus configured to be broken by an external force of a given magnitude and to be flexible, can further absorb the impact of the colliding object 38.

FIG. 6 is a perspective view of a production line illustrating a process of producing the windshield 12 according to the present invention, in which process steps are affixed the letters (a) to (k) and will be described in that order.

Step (a): Material plates 51 are prepared.

Step (b): The material plates 51 are cut into a predetermined shape to produce flat plates 52 which are stamped with a mark and chamfered.

Step (c): The flat plates 52 are washed by a cleaning device 53 and then dried.

Step (d): The flat plates 52 are provided with prints as necessary.

Step (e): The flat plate 52 to be the outer glass 32 of the windshield 12 (hereinafter referred to as an "outer plate") is superimposed on the flat plate 52 to be the inner glass 33 (hereinafter referred to as an "inner plate"). The flat plates 52 are put on a die 54 for bending by sagging.

Step (f): The die 54 with the two flat plates 52 placed thereon is passed through a furnace 56 for heating, and then slowly cooled.

Step (g): Resultant bent outer plate 57 and inner plate 58 are washed by a cleaning device 59.

Step (h): An interlayer 61 cut into a predetermined dimension after washing and inspection is inserted between the outer plate 57 and the inner plate 58 while being tensioned. A portion of the interlayer 61 extending off the edges of the outer plate 57 and inner plate 58 is trimmed.

Step (j): An assemblage 62 resulting in the step (h) is inserted into a rubber bag and is passed through a preparative press-bonding device 63 for heating. This heating may be skipped.

Step (k): The pre-bonded assemblage 62 is pressurized and heated by an autoclave device 64 for the final press-bonding of the assemblage 62.

The windshield 12 is produced in this manner. The windshield 12 is then inspected and packaged for shipment.

Figure 7:
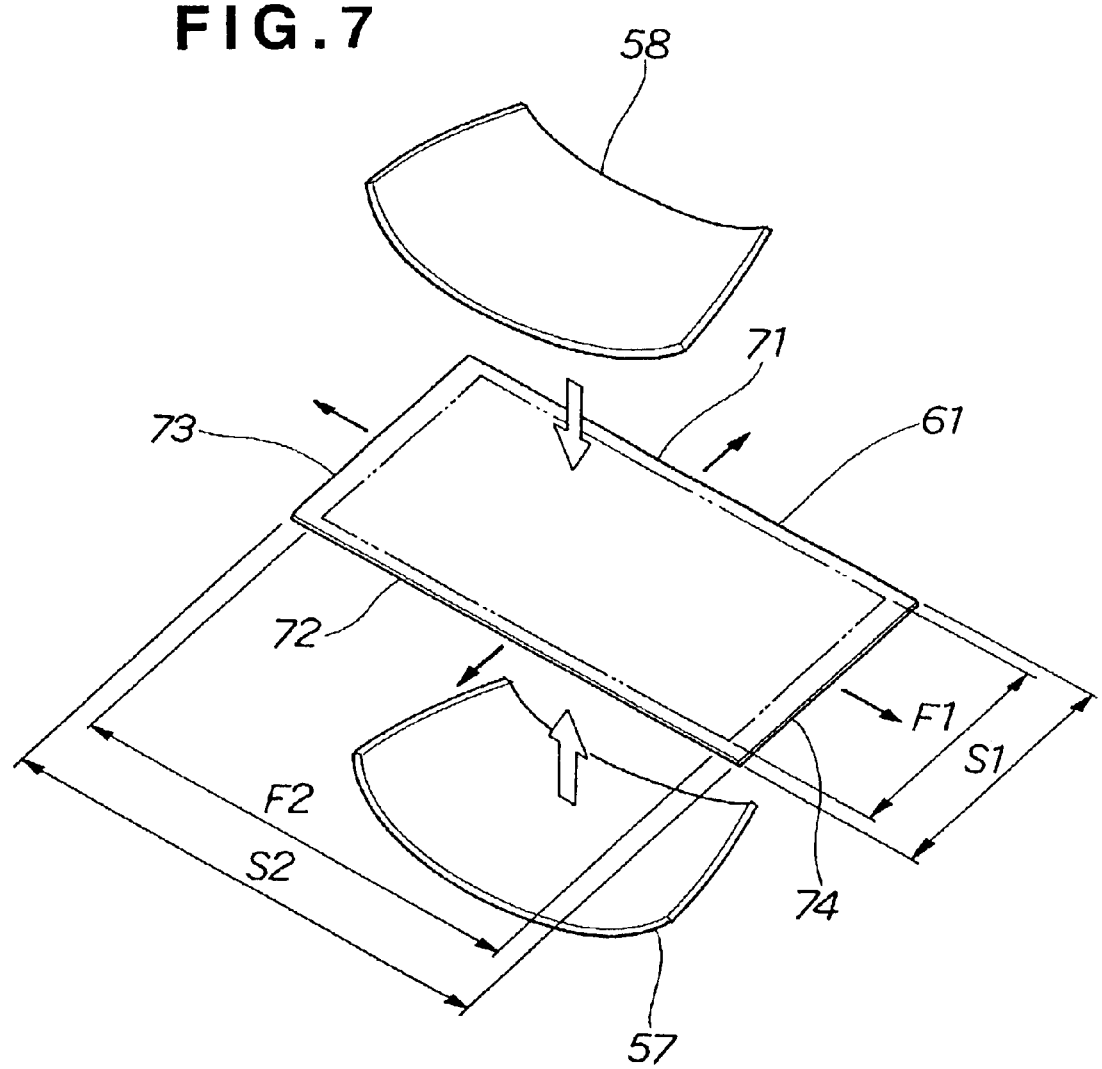
FIG. 7 is a diagram illustrating the application of tension to the interlayer shown in FIG. 6.
Figure 8A:
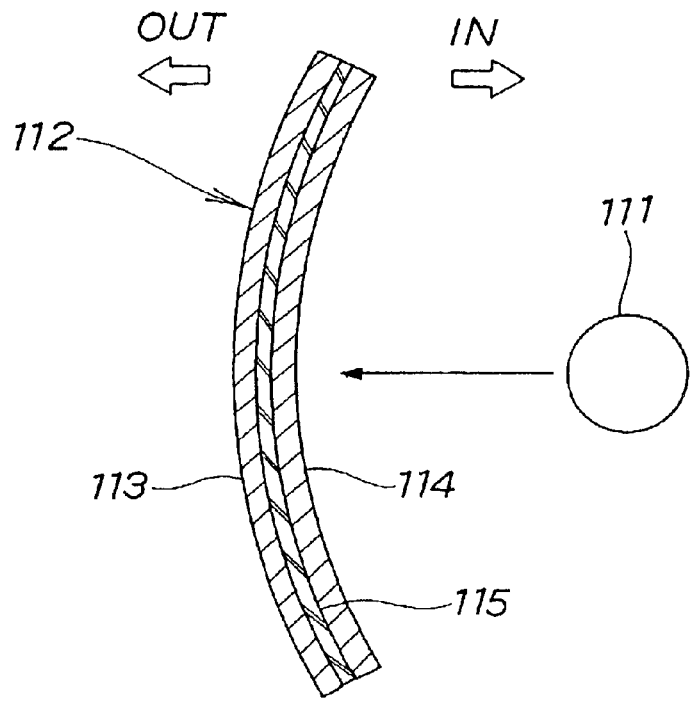
FIGS. 8A and 8B are cross-sectional views of the conventional windshield.
Figure 8B:
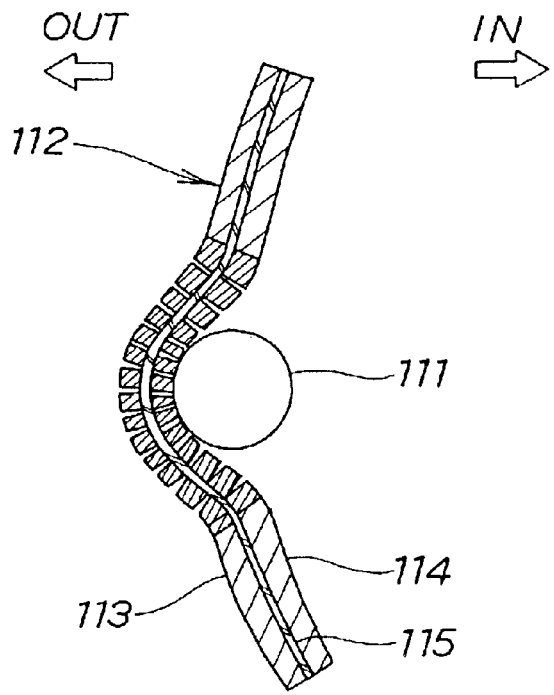

Now the application of tension to the interlayer 61 will be described with reference to FIG. 7.

First, the interlayer 61 are pulled at its sides 71 to 74 in arrow directions to apply tension to the interlayer 61. As a result, the interlayer 61 is expanded from a free length of longitudinal length F1 and transverse length F2 (length before the application of tension) into a set length (longitudinal length S1 and transverse length S2). That is, the interlayer 61 is tensioned to stretch in every direction.

On the interlayer 61 in this state, the outer plate 57 and the inner plate 58 are superimposed from the opposite sides as shown by hollow arrows for bonding.

The present disclosure relates to the subject matter of Japanese Patent Application No. 2002-169159, filed Jun. 10, 2002, the disclosure of which is expressly incorporated herein by reference in its entirety.

What is claimed is:

1. A vehicle windshield comprising:

a laminated glass curved outward of a vehicle passenger compartment said curved laminated glass consisting of two curved sheets of glass joined to each other by an interlayer of synthetic resin, the synthetic resin interlayer being disposed in a tensioned state so that when the curved sheets of glass are broken due to an impact force acting on the laminated glass from outside the vehicle passenger compartment, the synthetic resin interlayer is allowed to become straight to thereby displace the laminated glass toward the vehicle passenger compartment so as to absorb the impact force.

2. A vehicle windshield according to claim 1, wherein the synthetic resin interlayer is being tensioned in every direction.

3. A vehicle windshield according to claim 1, wherein when the laminated glass is subjected to the impact force, the tensioned synthetic resin interlayer enables the laminated glass to bend into a curvature projecting inward of the vehicle passenger compartment.

* * * * *